Figure 1:
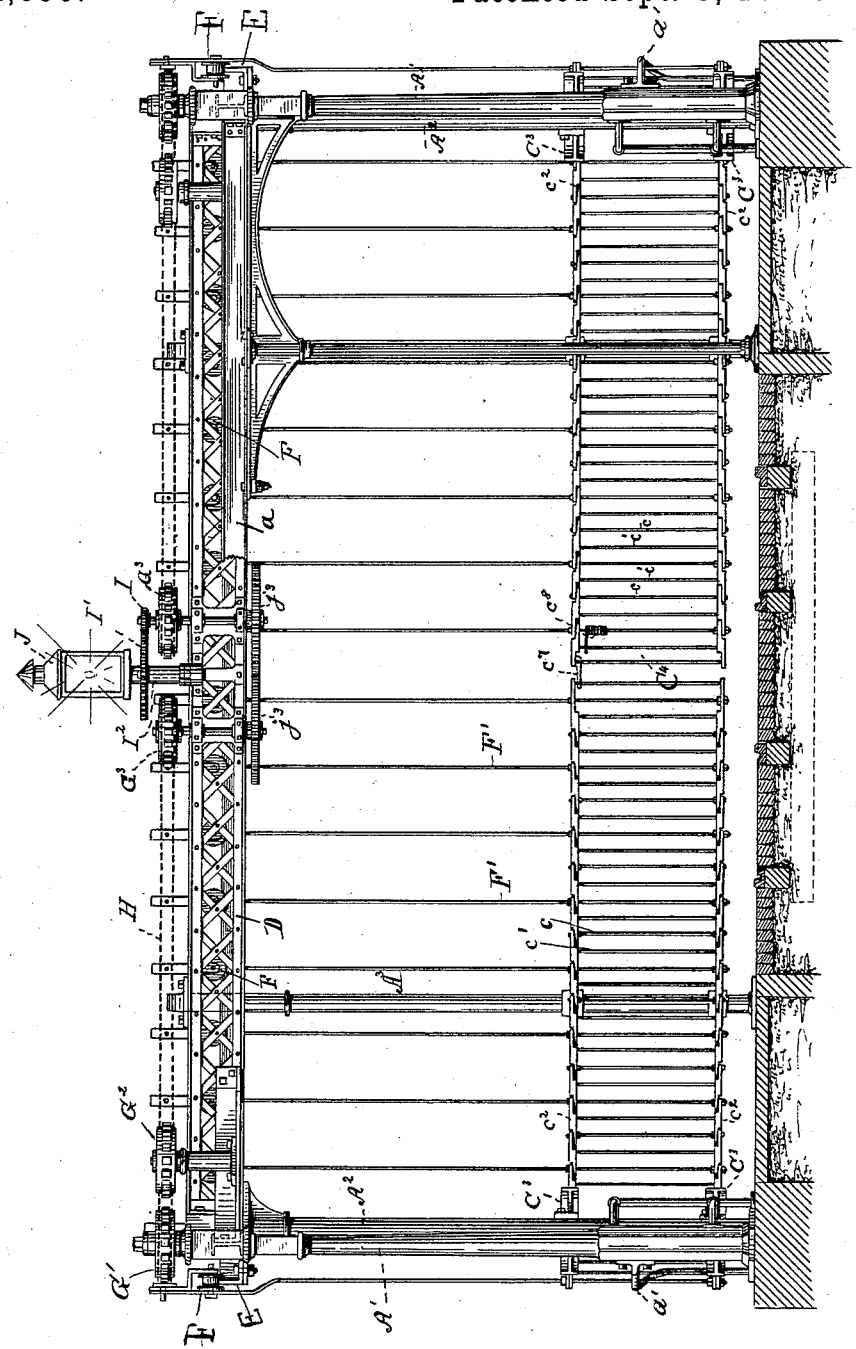

(No Model.)  T. H. BARNARD.  5 Sheets—Sheet 1.

GATE FOR BRIDGES.

No. 304,690.  Patented Sept. 9, 1884.

Witnesses:
Ephraim Banning
Lewis L. Blossom

Inventor:
Thomas H. Barnard
By Banning & Payson
Attorneys.

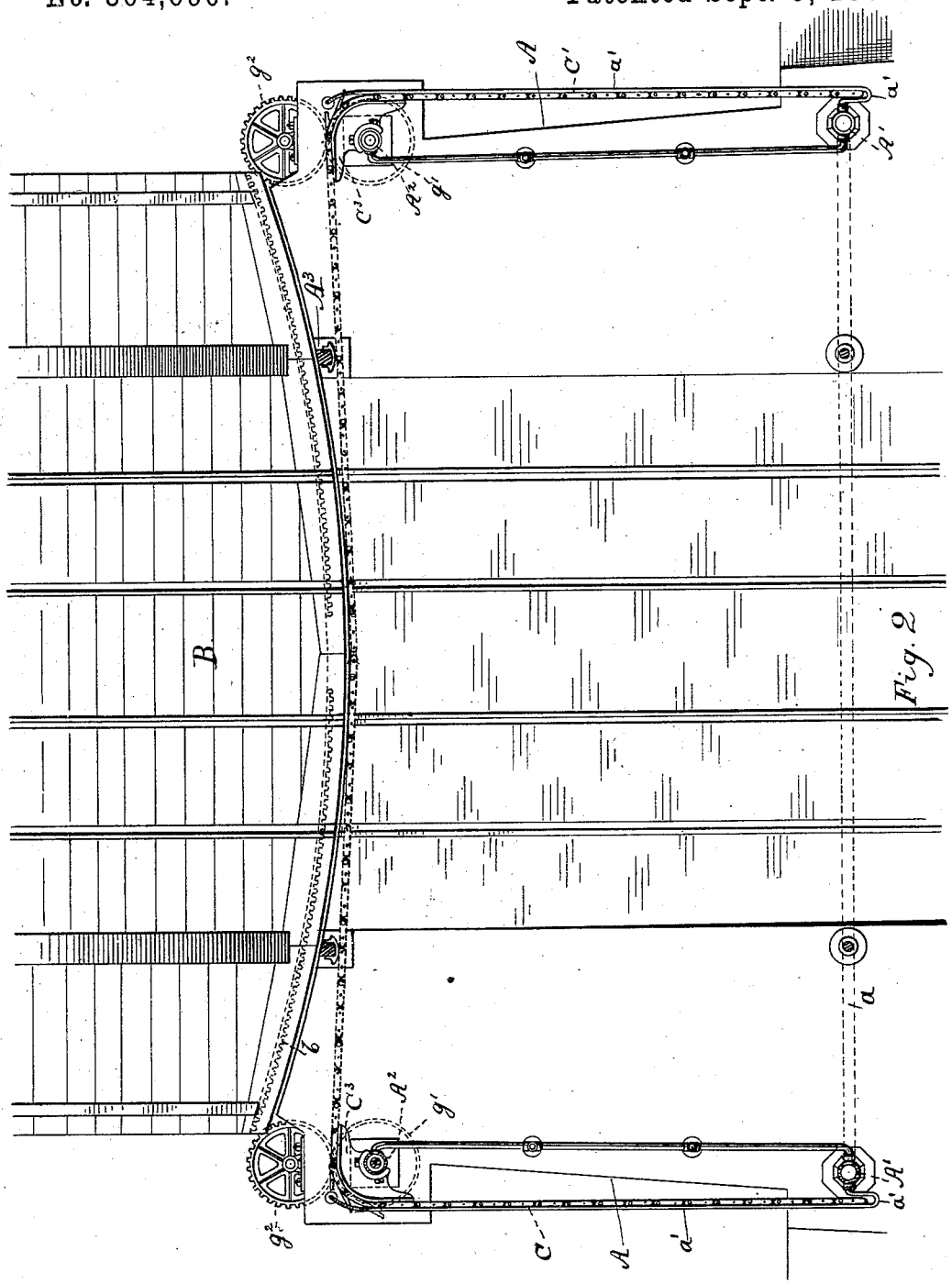

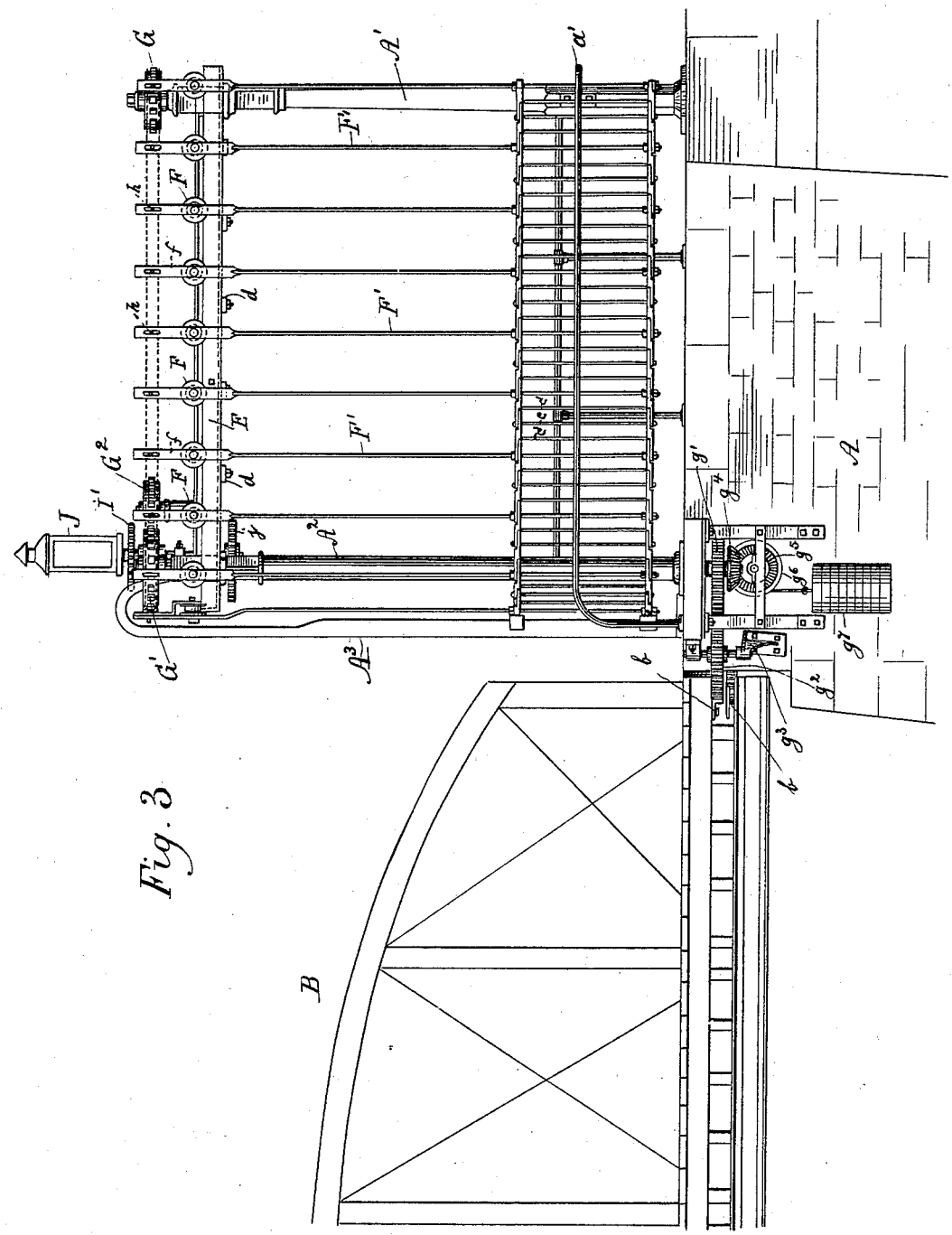

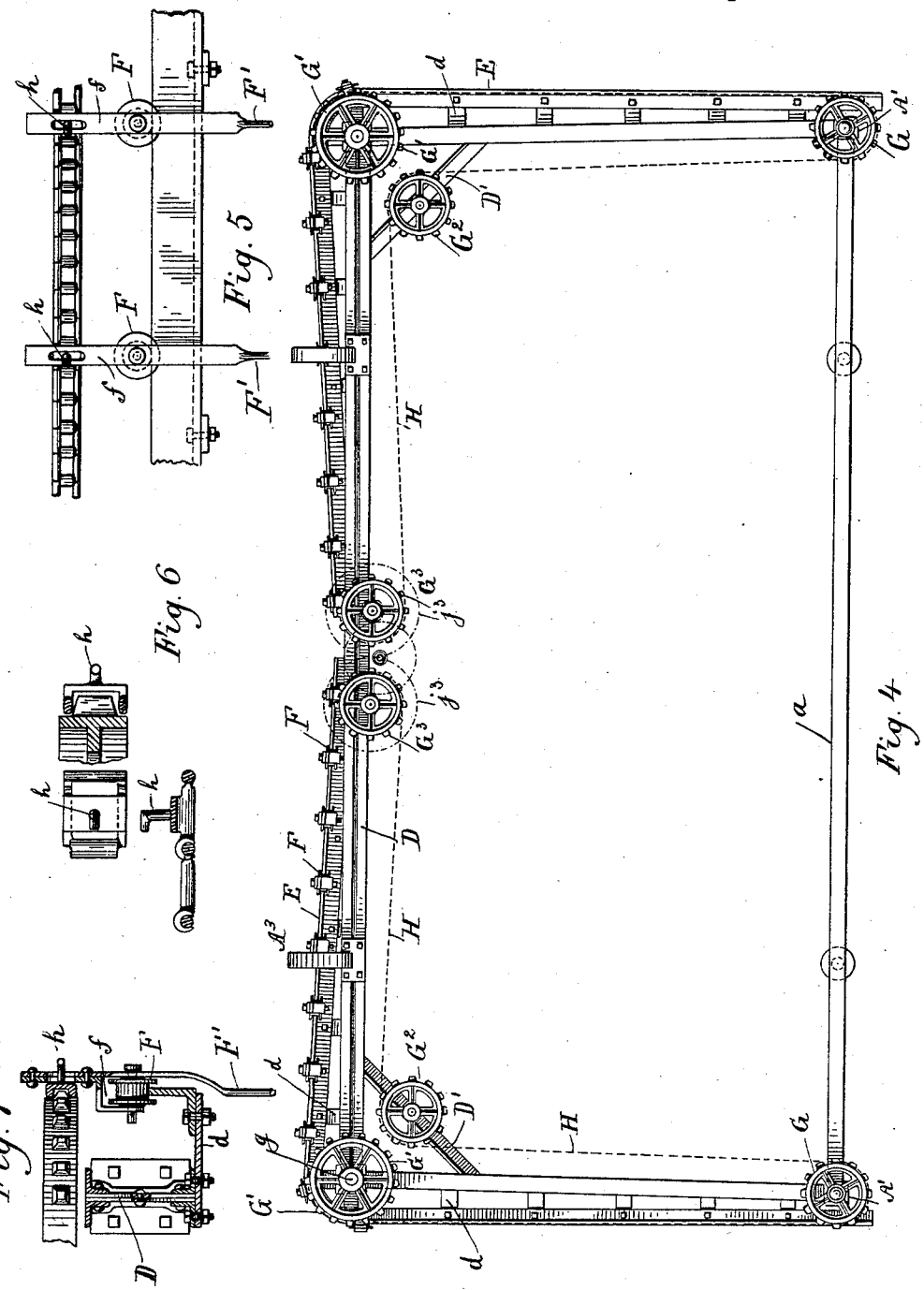
(No Model.)
T. H. BARNARD.
GATE FOR BRIDGES.
No. 304,690.   Patented Sept. 9, 1884.
5 Sheets—Sheet 4.

(No Model.) 5 Sheets—Sheet 5.
T. H. BARNARD.
GATE FOR BRIDGES.
No. 304,690. Patented Sept. 9, 1884.
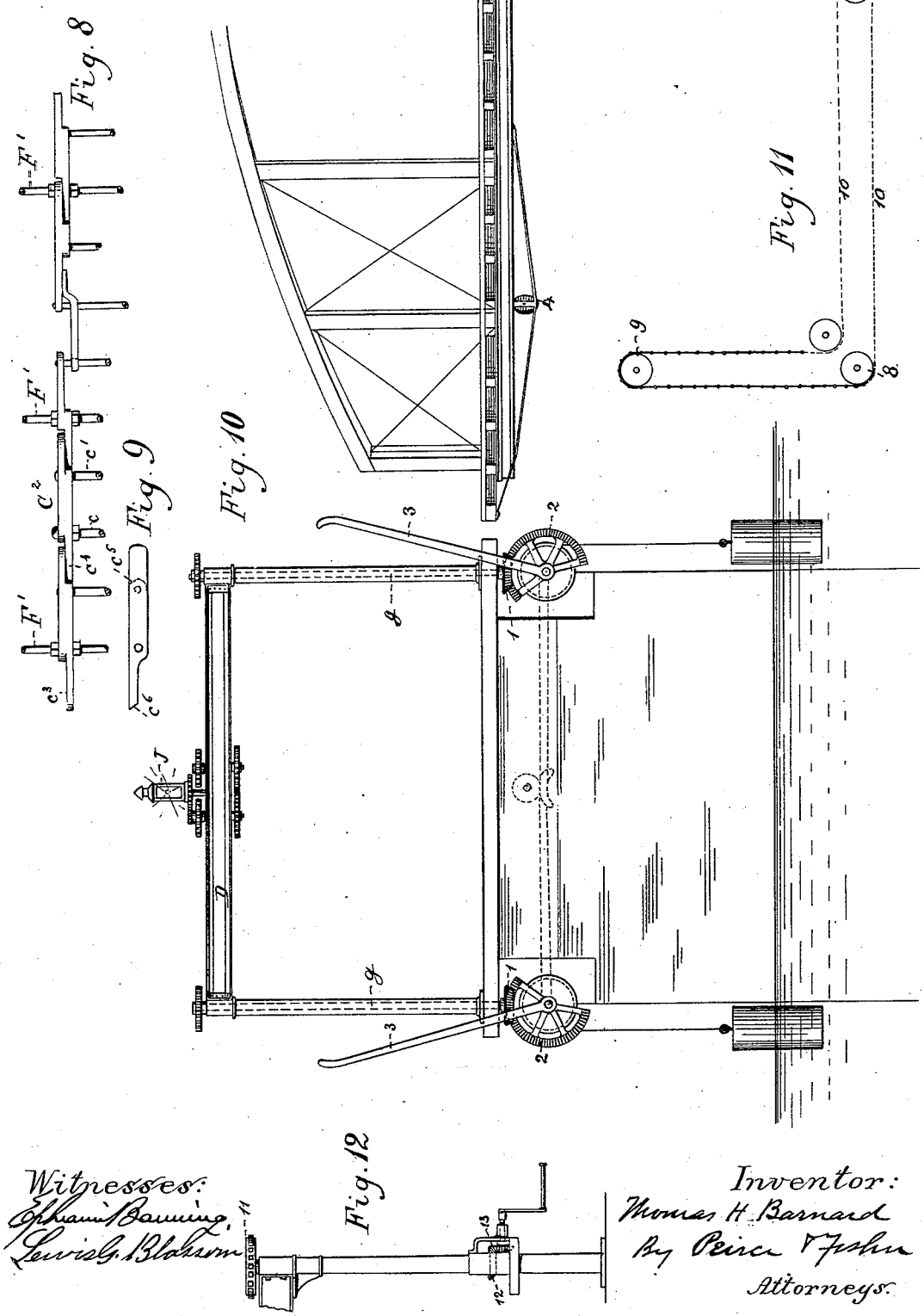
Witnesses:
Ephraim Banning
Lewis G. Blossom
Inventor:
Thomas H Barnard
By Peirce & Fisher
Attorneys.

UNITED STATES PATENT OFFICE.

THOMAS H. BARNARD, OF CHICAGO, ILLINOIS.

GATE FOR BRIDGES.

SPECIFICATION forming part of Letters Patent No. 304,690, dated September 9, 1884.

Application filed February 11, 1884. (No model.)

*To all whom it may concern:*

Be it known that I, THOMAS H. BARNARD, a citizen of the United States, residing at Chicago, in the county of Cook and State of Illinois, have invented certain new and useful Improvements in Gates for Bridges and other Purposes, of which I do declare the following to be a full, clear, and exact description, reference being had to the accompanying drawings, forming part of this specification, in which—

Figure 1 is a view in front elevation. Fig. 2 is a view in horizontal section above the gate, parts being shown in plan. Fig. 3 is a view in side elevation. Fig. 4 is a plan view of the gate-operating mechanism at the end of one of the approaches to a bridge. Fig. 5 is a detail view, in side elevation, of a portion of the sprocket-chain, the hangers, and the suspension-rail for the gate. Fig. 6 shows detail views of the sprocket-chain. Fig. 7 is a detail view in vertical transverse section through the suspension-rail and upper part of one of the gate-hangers. Figs. 8 and 9 are enlarged detail views of the top and bottom plates of the gate-sections. Fig. 10 is an end view of one of the approaches of a bridge, showing modified mechanism for operating the gate and showing, in perspective, the end of the bridge as it is about to close. Fig. 11 is a view illustrating in outline a modified arrangement of the gate and its operating mechanism. Fig. 12 is a view in end elevation of the crank-post shown in Fig. 11.

Like letters of reference designate corresponding parts in the several figures of the drawings.

My present invention has relation to the improvement of gates; and in particular does it relate to that class of gates which, while adapted to be used in various situations, are especially well suited for use in connection with swinging bridges to close the approaches thereto when the bridges are open for the passage of vessels.

The main object of my invention has been to provide for the approaches or roadways of a swinging bridge, an improved construction of sliding gate, and mechanism for operating the same, whereby when the bridge is opened the approaches shall automatically and with certainty be closed, and whereby, when the bridge is closed, the approaches shall be automatically opened and free for travel. In accomplishing this object, as has been done by the devices hereinafter described, and illustrated in the accompanying drawings, I have produced an improved construction of gate and operating mechanism which, although particularly well suited for such purpose, is also adapted as to its main features for much more extended use. I wish it to be distinctly understood, therefore, that, although the invention is here shown as applied to a swinging bridge, its scope is not restricted thereto, and I shall therefore point out with greater particularity the novel features of the invention in the claims at the end of this specification.

Upon the piers A, at the ends of the approaches to the swinging bridge B, are placed the end posts, A', the corner-posts $A^2$, and the front posts, $A^3$, which serve to sustain the gate and its operating mechanism. The posts A' are connected together by the brace-beam $a$, and at each side of the pier may be placed suitable guide-rails, $a'$.

My improved gate being preferably formed of two like sections, C and C', as shown, and the operating mechanism of each section being the same, a description of one will be applicable to both.

Between the upper parts of the corner-posts $A^2$ extends the main girder D, and along the front of this girder, and preferably connected thereto by tie-irons $d$, extend the two parts of the suspension-rail E, by which the sections of the gate are respectively carried. The parts of this suspension-rail are bent, as shown, at the corner-posts, and have their rear ends secured to the upper parts of the posts A'.

Upon each portion of the rail E travel a series of wheels, F, held in suitable journal-straps $f$, on the hanger-rods F', that are connected to the gate-sections, as shown in Figs. 5, 6, and 7.

By reference to the enlarged detail view, Figs. 8 and 9, it will be seen that the gate-sections are formed of vertical rods $c$ and $c'$, the lower portions of the hanger-rods F', and the top and bottom plates, $c^2$. The rods $c$ are rigidly connected to the plates $c^2$, which are cut away, as shown, upon their opposite faces at $c^3$ and $c^4$, and are perforated at their ends to receive the rods $c'$ and the hanger rods F', that serve to hinge the plates together. These plates $c^2$ are provided each with the inclined shoulder $c^5$, and a corresponding beveled end $c^6$, and are so hinged together that the gate is rendered flexible in one direction only, and cannot be bent in the opposite direction. It will thus be seen that when the gate is closed it cannot be forced outward, and will securely guard the approaches. My object in making the gate laterally flexible (and it is obvious that the precise manner of doing this can be greatly varied) is to allow it to be turned in line with the roadway when opened, and hence occupy at such time a position in which it will not interfere with travel. Segmental guide-plates $C^3$ are connected with the corner-posts $A^2$, and against these the top and bottom plates $c^2$ of the gate-sections bear as the gate is bent, in being opened or closed. It will be seen that the two sections C and C' of the gate are of sufficient length to close the roadway, and a catch, $c^7$, may be used to hold them firmly together. To avoid all danger of accidents arising from persons being caught between the ends of the gate-sections when closing, I provide one of these sections with a hinged portion, $C^4$, held normally in line with the gate by means of the springs $c^8$.

At the tops of the posts A' and $A^2$, upon the corner-plate D', and upon the main girder D, near its center, are carried, respectively, the sprocket-wheels G, G', $G^2$, and $G^3$, over which passes the sprocket-chain H, connected to the tops of the hanger-rods F' by means of the hooks $h$. This sprocket-chain has motion imparted thereto from the wheel G', keyed to the end of the vertical drive-shaft $g$, that passes through the corner-post $A^2$, and carries near its opposite end the cog-wheel $g'$, meshing with the cog-wheel $g^2$, that is sustained by the bracket $g^3$, and extends a sufficient distance beyond the pier A to gear with the rack-bar $b$, attached to the end of the bridge.

To the extreme end of the drive-shaft $g$ is keyed the bevel gear-wheel $g^4$, that meshes with the corresponding bevel gear-wheel $g^5$ on the end of the drum $g^6$, over which passes the chain sustaining the counterbalance-weight $g^7$. This weight is so arranged that its chain will be wound upon the drum by the momentum of the closing bridge, and when thus lifted the weight will exert its force to close the gate as the bridge is being opened, and so put no more work upon the attendant, in case the bridge is swung by hand, than is required to overcome the inertia of the bridge. The sprocket-wheels G and $G^2$ are idlers, and serve to guide the chain. The wheels $G^3$ carry, at the lower ends of their journal-shafts, the cog-wheels $g^3$, which are in gear, and thus cause the two sections of the gate to move in unison. The journal-shaft of one of the wheels $G^3$ is preferably furnished at its upper end with a cog-wheel, I, that meshes with the cog-wheel I', that is carried by a suitable shaft, $I^2$, carrying at its top the signal-lantern J. This lantern will have its opposite glasses of like color, and its adjoining glasses of different color, and the gear-wheels I and I' will be of such relative sizes as to cause a half-revolution of the lantern at each complete opening and closing of the gate. Thus when the gate is open, the white light will appear toward the roadway and the red light toward the river, and vice versa when the bridge is closed. My purpose in placing the cog-wheels and driving-shafts at each side of the roadway is to insure the operation of the gate whichever way the bridge be opened or closed. The rack-bars $b$ at the ends of the bridge are placed, as shown in Fig. 3, in different horizontal planes, so that the rack-bar for gear-wheels of one gate-section shall not interfere with those of the other section. It will be noticed that these rack-bars must be of proper length to exactly complete the movement of the gate-sections in either direction, and are placed in such position that the bridge shall be partially closed before the gate begins to open, thus leaving the ends of the roadway at no time exposed.

From the foregoing description the operation will be seen to be as follows: If the bridge be closed and the gate open, the operation of opening the bridge will cause the rack-bars $b$ to impart motion to the train of cog-wheels at the sides of the pier, which in turn will cause the drive-shafts and sprocket-wheels to revolve and force the sprocket-chains to move the gate-sections toward each other until they meet, at which time the rack-bar will cease to act upon the gear-wheels and the bridge will be open. In this operation the counterbalance-weight will aid in closing the gate, so that the power necessary to swing the bridge open need not be greater than would be required were no gate used. In closing the bridge, the momentum acquired before it comes opposite the piers will be sufficient to reverse the movement of the sprocket-chain and wheels and thereby open the gate and at the same time lift the counterbalance-weight into operative position.

It is obvious that the details of construction hereinbefore described may be varied within wide limits without departing from the spirit of the invention; also, that many of the features may be employed independently of the others. In Fig. 10 of the drawings, for example, is illustrated a somewhat modified means of operating the gate by the bridge. In this construction there is keyed to the ends of the main driving-shafts $g$, the bevel gear-wheels 1, beneath which and engaging therewith are the segmental bevel gear-wheels 2, to the shafts of which and extending into the path of the bridge are the lever-arms 3. Beneath the end of the bridge, and carried thereby, is the friction-wheel 4, which will bear upon the lever-arms 3, when they have been bent down by the bridge in closing. If desired, arches may be placed across the ends of the bridge, to carry rack-bars similar to the rack-bars shown upon the ends of the bridge, which will engage with cog-wheels on the main girder and in gear with the sprocket wheels and chains of the gate.

In adapting my improvements for use in other connections than with swinging bridges, the operating mechanism will be modified somewhat, depending upon the source of power and the position from which the gate is to be controlled.

In Figs. 11 and 12 of the drawings is illustrated a modified arrangement of the gate, wherein it is made of a single section of sufficient length to extend between the posts 7 and 8 at each side of the roadway, and is caused to bend around the corner-post 8 and rear post, 9, by the action of the sprocket-chain 10, driven by the sprocket-wheel 11, and passing around suitable sprocket-wheels on the tops of the posts. The shaft of this sprocket-wheel 11 is furnished at its bottom with the bevel gear-wheel 12, with which engages the bevel gear-wheel 13, journaled in the bracket 14, and operated by the hand-crank 15. From this construction it will be seen that by turning the hand-crank the sprocket-chain will readily open and close the gate.

With the exceptions indicated, the construction and operation of this modified form of gate and operating mechanism do not differ essentially from those hereinbefore described. This last modification will be found well suited for use in a variety of situations—as, for example, at railway-crossings, toll-gates, and the like.

Having thus described my invention, what I claim as new, and desire to secure by Letters Patent, is—

1. The combination, with a laterally-flexible sliding gate and suitable supporting-posts, of a sprocket chain and wheel for opening and closing the gate, substantially as described.

2. The combination, with a laterally-sliding flexible gate and suitable supporting-posts, of sprocket chain and wheels, a drive-shaft, and gear mechanism, whereby the gate may be operated, substantially as described.

3. The combination, with the laterally-flexible sliding gate and a bent guide-rail and hangers for sustaining said gate, of a sprocket-chain connected to said hangers, and wheels for operating said chain, substantially as described.

4. The combination, with a laterally-sliding gate, flexible in one direction only, of an overhead bent guide-rail, suitable supporting-posts, hangers for sustaining said gate, and a sprocket-chain connected to said hangers and sprocket-wheels connected to said chain, substantially as described.

5. The combination, with the laterally-flexible sliding gate and an overhead bent guide-rail and suitable supporting-posts, of hangers for sustaining said gate, a sprocket-chain connected to said hangers, sprocket-wheels, and a vertical shaft and gear mechanism for operating said wheels, substantially as described.

6. The combination, with the posts at opposite sides of the roadway, of the sliding gate-sections, one of which is provided with the laterally-yielding, spring-acting end portion, substantially as and for the purpose set forth.

7. The combination, with the separate gate-sections, of sprocket chains and wheels for operating said sections, said sprocket chains and wheels being geared together, substantially as and for the purpose set forth.

8. The combination, with the two gate-sections geared together for conjoint operation, and an overhead beam extending across the roadway, of a signal-lantern sustained centrally upon the overhead beam and in gear with the mechanism that operates the gate-sections, all substantially as described.

9. The combination, with the swinging bridge, of a laterally-flexible sliding gate, an overhead bent rail and hangers for sustaining said gate, and an overhead sprocket chain and wheels for operating the gate, substantially as described.

10. The combination, with the laterally-flexible sliding gate-sections, the hangers, the overhead bent rails, and suitable supporting-posts, of the posts $A^3$, for resisting any outward thrust upon the gate-sections, substantially as described.

In testimony whereof I have hereunto set my hand this 5th day of February, 1884.

THOMAS H. BARNARD.

Witnesses:
GEO. P. FISHER, Jr.,
JAMES H. PEIRCE.